United States Patent
Vurgaftman et al.

(10) Patent No.: US 9,305,122 B1
(45) Date of Patent: Apr. 5, 2016

(54) COMPUTATIONALLY EFFICIENT METHOD FOR BUILDING QUANTUM HETEROSTRUCTURES

(71) Applicants: Igor Vurgaftman, Severna Park, MD (US); Jerry R. Meyer, Catonsville, MD (US); Chaffra Affouda, Washington, DC (US); Matthew P. Lumb, Alexandria, VA (US); Edward H. Aifer, Arlington, VA (US)

(72) Inventors: Igor Vurgaftman, Severna Park, MD (US); Jerry R. Meyer, Catonsville, MD (US); Chaffra Affouda, Washington, DC (US); Matthew P. Lumb, Alexandria, VA (US); Edward H. Aifer, Arlington, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 14/615,499

(22) Filed: Feb. 6, 2015

Related U.S. Application Data

(60) Provisional application No. 61/939,808, filed on Feb. 14, 2014.

(51) Int. Cl.
| | |
|---|---|
| *G06F 17/50* | (2006.01) |
| *H01S 5/34* | (2006.01) |
| *H01L 33/06* | (2010.01) |
| *H01L 31/0352* | (2006.01) |

(52) U.S. Cl.
CPC ........ *G06F 17/5009* (2013.01); *G06F 17/5068* (2013.01); *G06F 2217/16* (2013.01); *H01L 31/035236* (2013.01); *H01L 33/06* (2013.01); *H01S 5/3422* (2013.01)

(58) Field of Classification Search
USPC .......................... 716/30; 257/13, 14, 15, 194
See application file for complete search history.

(56) References Cited

U.S. PATENT DOCUMENTS

2007/0054427 A1* 3/2007 Laikhtman ............. B82Y 20/00
438/22

OTHER PUBLICATIONS

J. R. Meyer, C. A. Hoffman, F. J. Bartoli, and L. R. Ram-Mohan, "Type-II quantum well lasers for the mid-wavelength infrared", Appl. Phys. Lett., vol. 67, pp. 757-759 (1995)).

L. Esaki, "Do-it-yourself quantum mechanics in low-dimensional structures," Physica Scripta, vol. T42, pp. 102-109, 1992.

E.H. Aifer, J.G. Tischler, J.H. Warner, I. Vurgaftman, W.W. Bewley, J.R. Meyer, J.C. Kim, L.J. Whitman, C.L. Canedy and E.M. Jackson, "W-structured type-II superlattice long-wave infrared photodiodes with high quantum efficiency," Appl. Phys. Lett. 89, 053519 (2006).

P. F. Qiao, S. Mu, and S. L. Chuang, "Electronic band structures and optical properties of type-II superlattice photodetectors with interfacial effect," Opt. Express 20, 2319 (2012).

* cited by examiner

*Primary Examiner* — Brian Ngo
(74) *Attorney, Agent, or Firm* — US Naval Research Laboratory; Joslyn Barritt

(57) ABSTRACT

A computationally efficient method for building a superlattice structure that improves an optoelectronic device performance characteristic that depends on fundamental superlattice material properties such as absorption coefficient $\alpha(\hbar\omega)$, radiative efficiency $R_{sp}$ and/or electron density n.

3 Claims, 3 Drawing Sheets

COMPUTATIONALLY EFFICIENT METHOD FOR BUILDING QUANTUM HETEROSTRUCTURES

CROSS-REFERENCE

This application is a Nonprovisional of, and claims the benefit of priority under 35 U.S.C. §119 based on, U.S. Provisional Patent Application No. 61/939,808 filed on Feb. 14, 2014, the entirety of which is hereby incorporated by reference into the present application.

TECHNICAL FIELD

The present invention relates to the simulation and design of certain parameters of quantum heterostructures involving semiconductors, especially type-II superlattices.

BACKGROUND

Quantum wells, superlattices, and other quantum heterostructures comprised of thin semiconductor layers deposited by molecular beam epitaxy (MBE), metalorganic chemical vapor deposition (MOCVD), or some other process, are important components in a number of optoelectronic devices. Many of the unique and advantageous properties of semiconductor quantum heterostructures result from the ability to tune (or engineer) their electronic band structure, and other properties that depend on the electronic band structure, by varying the layer thicknesses and elemental, binary, or alloy layer compositions. Of the optoelectronic properties that can be varied, some of the most important for many applications such as lasers, light detection, solar cells for power generation, or thermophotovoltaics, are the optical absorption coefficient, the spontaneous emission rate, and the carrier concentration as a function of the quasi-Fermi levels. Accurate modeling of these quantities in layered materials therefore represents an important component of device simulations that are needed for materials/device design, device optimization, and data interpretation.

Superlattices are typically classified as being either type-I or type-II. In a type-I structure (such as GaAs/AlGaAs), both the conduction band minimum and valence band maximum reside in the same material (GaAs in this example). Therefore, the electron and hole wavefunctions are concentrated mostly in the same material (GaAs), hence they tend to overlap strongly for a large optical matrix element. On the other hand, a type-II superlattice (such as InAs/GaInSb) has its conduction band minimum in one material (InAs) while the valence band maximum is in another (GaInSb). In that case, the electron and hole wavefunctions do not necessarily overlap strongly and the optical matrix element may be much smaller. Type-I and type-II superlattices may also have different symmetries, with the two-layer type-II superlattice and the three-layer type-II quantum well being classic examples of asymmetric systems.

To illustrate the implementation and advantages of the invention, the following description treats the particular example of a type-II antimonide superlattice. However, the invention is similarly advantageous when applied to most type-II superlattices, and some features substantially reduce the run times required to compute the absorption coefficients, radiative emission rates, carrier densities, and other properties for type-I quantum wells and superlattices as well.

Antimonide type-II superlattices are promising as the absorber material for long-wave infrared (LWIR), very long-wave infrared (VLWIR), and mid-wave infrared (MWIR) photodetectors. These III-V-based photodetectors have a number of potential advantages over the incumbent InSb and HgCdTe technologies, such as higher-temperature operation, improved wafer-scale manufacturability, and larger substrates. However, the understanding of the type-II superlattices, which can be comprised of two-constituent InAs/Ga(In)Sb and InAs/InAsSb designs as well as somewhat more complicated multi-constituent structures, remains incomplete at this date. In order to realize the full potential of the type-II superlattices, their absorption characteristics must be carefully modeled, since these play the dominant role in determining the quantum efficiency (QE) of the photodetector when the diffusion length is comparable to or greater than the absorption depth. Furthermore, in many circumstances it is important to model the radiative lifetime in these superlattices in order to estimate its contribution to the total lifetime, which in turn determines the dark current density of the photodetectors. The radiative lifetime is also important for estimating the efficiency of light-emitting diodes (LEDs), the threshold for lasers, and other properties of optoelectronic devices.

In order to evaluate the dark current densities in photodiode and photovoltaic structures, it is also important to calculate the intrinsic carrier density as well as the variation of the quasi-Fermi level position with carrier density. The latter is needed when the doping is so high that the carrier density is degenerate, or in some cases, to calculate the contribution of a particular trap with an energy inside the band gap to the Shockley-Read recombination rate. While reasonable guesses can be obtained using the parabolic approximation with the appropriate density-of-states effective mass, a more accurate evaluation is needed in many circumstances.

The absorption coefficient $\alpha(\hbar\omega)$, reflecting the percentage of the incident light that is absorbed, is an important characteristic of a semiconductor superlattice used for such photodiode and photovoltaic structures and can be calculated from the following equation:

$$\alpha(\hbar\omega) = \frac{4\pi^2\alpha_0}{n_r}\frac{1}{\hbar\omega}\sum_{n,m}\int_{-\frac{\pi}{d}}^{+\frac{\pi}{d}}\frac{dk_z}{2\pi}\int_0^{2\pi}d\varphi\int_0^{\infty}\frac{k_\parallel dk_\parallel}{4\pi^2}|M(k)|^2[f_m(E_m(k)) - f_n(E_n(k))]L(E_n(k) - E_m(k) - \hbar\omega),$$

where $\hbar\omega$ is the photon energy of the light incident on the superlattice; $\alpha_0$ is the fine-structure constant; $n_r$ is the refractive index of the absorbing material; $|M|^2$ is the square of the optical matrix element given by $|\nabla_k H|^2$, where H is the band structure Hamiltonian; m is the valence subband and n is the conduction subband; L is the lineshape function (see S. W. Corzine, R.-H. Yang, and L. A. Coldren, "Optical Gain in III-V Bulk and Quantum-Well Semiconductors", Chap. 1 in *Quantum Well Lasers*, ed. by P. S. Zory, Academic, New York 1993), which depends on the difference between the electron energy $E_n$ and the hole energy $E_m$ at wavevector k; $f_m$ and $f_n$ are hole and electron Fermi functions, respectively; and d is the superlattice period.

Generally, the absorption coefficient derived from Equation (1) is relatively insensitive to the precise form assumed for the lineshape function, which may be approximated as a delta function, Lorentzian, Gaussian, 1/cos h(x) function, or some other suitable form. If population inversion is established, i.e., $f_m - f_n < 0$, the absorption coefficient takes on a negative value and in such a case is commonly referred to as the "gain coefficient." This coefficient is important in simulations of laser properties where the gain must be calculated.

While in principle it is straightforward to derive the absorption coefficient from the superlattice band structure and optical matrix elements (see J. R. Meyer, C. A. Hoffman, F. J. Bartoli, and L. R. Ram-Mohan, "Type-II quantum-well lasers for mid-wavelength infrared," *Appl. Phys. Lett.* 67, 757 (1995)), the existing methods for doing so require integration over the band structure in a three-dimensional region of k space. That is, three integrations must be carried out in k space, $$\text{i.e., } \int_{-\frac{\pi}{d}}^{\frac{\pi}{d}} \frac{dk_z}{2\pi}, \int_0^{2\pi} d\varphi, \text{ and } \int_0^{\infty} \frac{k_\| dk_\|}{4\pi^2}.$$

This requires accumulating a large number of band structure data points covering the entire region so that the integration procedure converges. The band structure data points for such quantities as $E_i(k)$ and $M(k)$ are obtained by diagonalizing the Hamiltonian matrix and post-processing the resulting eigenvalues and eigenvectors at each value of k.

Any superlattice having barriers sufficiently thin that the structure is not effectively a quantum well can exhibit significant dispersion along the vertical (z) direction. Furthermore, because the dispersions of the various electron and hole subbands may vary significantly with in-plane direction, using conventional procedures one must evaluate the various quantities such as the energy for each subband $E_i(k)$ and the optical matrix element $M(k)$ at a large number of points in k space as the three integrations are performed numerically. Because these evaluations, which require diagonalizing the Hamiltonian using the 8-band k·p or some other method, can consume a great deal of computer run time, the full numerical evaluation of all three integrals can be extremely slow.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a computationally efficient method for building a superlattice structure based on fundamental superlattice material properties such as absorption coefficient $\alpha(\hbar\omega)$, radiative efficiency $R_{sp}$ and/or electron density n.

The generalized expression for a fundamental superlattice material property takes the form:

$$A = B \sum_{n,m} \int_{-\pi/d}^{+\pi/d} \frac{dk_z}{2\pi}$$

$$\int_0^{2\pi} d\varphi \int_0^{\infty} \frac{k_\| dk_\|}{4\pi^2} g[E_m(k_z, k_\|, \varphi), E_n(k_z, k_\|, \varphi), M(k_z, k_\|, \varphi)].$$

Using numerical methods known in the art, the Equation above may be evaluated to any desired degree of accuracy by replacing the three-fold integral by finite sums over discrete intervals $\Delta k_z$, $\Delta k_{z1}$, and $\Delta \varphi$, together with a weighting function w:

$$A = B \sum_{n,m} \sum_{p=1}^{P} \frac{\Delta k_z}{2\pi} \sum_{q=1}^{Q} \Delta \varphi \sum_{r=1}^{R} \frac{k_{\|r} \Delta k_\|}{4\pi^2} g[E_m(k_{zp}, k_{\|r}, \varphi_q), E_n(k_{zp}, k_{\|r}, \varphi_q), M(k_{zp}, k_{\|r}, \varphi_q)] w(p, q, r)$$

In a typical calculation of interest, the number of points used in evaluating the $k_z$ and $\varphi$ summations require at least P=10 and Q=5, respectively, so that in order to evaluate the triple integral, the function g(k) must be evaluated at a total of 50×R values of k, each of which requires substantial computing time to diagonalize the Hamiltonian.

Using the method of the present invention, the number of diagonalizations needed is reduced to 2×R, for a typical savings of a factor of 25 in the computing speed required to perform each evaluation. This is accomplished by incorporating approximate, but very accurate, expressions for $E_n(k)$, $E_m(k)$, and $M(k)$ into the summations of the above equation, where the expressions for $E_n(k)$, $E_m(k)$, and $M(k)$ only need to be evaluated at two values of $k_z$ and one value of $\varphi$, rather than at all P×Q values that would normally be required.

In the computationally efficient method for bulding a quantum hetero structure in accordance with the present invention, the functions $E_m(k)$, $E_m(k)$, and $M_m(k)$ are approximated for a single value of $\varphi$, $\varphi=25°$, where $E_m(k)$ and $E_m(k)$ are approximated as $$E_j(k_{zp}, k_{\|r}, 25°) = E_j(k_z = 0, k_{\|r}, 25°) + \frac{E_j(k_z = \pi/d, k_{\|r}, 25°) - E_j(k_z = 0, k_{\|r}, 25°)}{2} [1 - \cos(k_{zp}a)]$$

and $M_m(k)$ is approximated as $$|M(k_{zp}, k_{\|r}, 25°)| = |M(k_z = 0, k_{\|r}, 25°)| - \left[|M(k_z = 0, k_{\|r}, 25°)| - \left|M\left(k_z = \frac{\pi}{d}, k_{\|r}, 25°\right)\right|\right] k_{zp}^2 d^2.$$

These approximations for $E_m(k)$, $E_m(k)$, and $M_m(k)$ are are then used in the summation to find one or more material properties $A_i$ of a semiconductor superlattice or other quantum heterogructure, e.g., to find its absorption coefficient $\alpha(\hbar\omega)$ the radiative coefficient $R_{sp}$, or electron density n.

Using this information, a semiconductor superlattice or other quantum heterostructure can then be built to achieve the desired results.

In one embodiment, the present invention provides a method for building a semiconductor superlattice or other quantum heterostructure that maximizes a chosen performance characteristic of an optoelectronic device whose performance is influenced by the material characteristics resulting from the layering configuration of the superlattice.

In a second embodiment, the present invention provides a method for building a semiconductor quantum heterostructure that maximizes a chosen optoelectronic device performance characteristic that depends on one or more fundamental material properties $A_1, A_2, A_3, \ldots$ whose functional form involves only two-dimensional integrals in k-space, since there is no significant dispersion along the $k_z$ axis.

DETAILED DESCRIPTION

Figure 1:
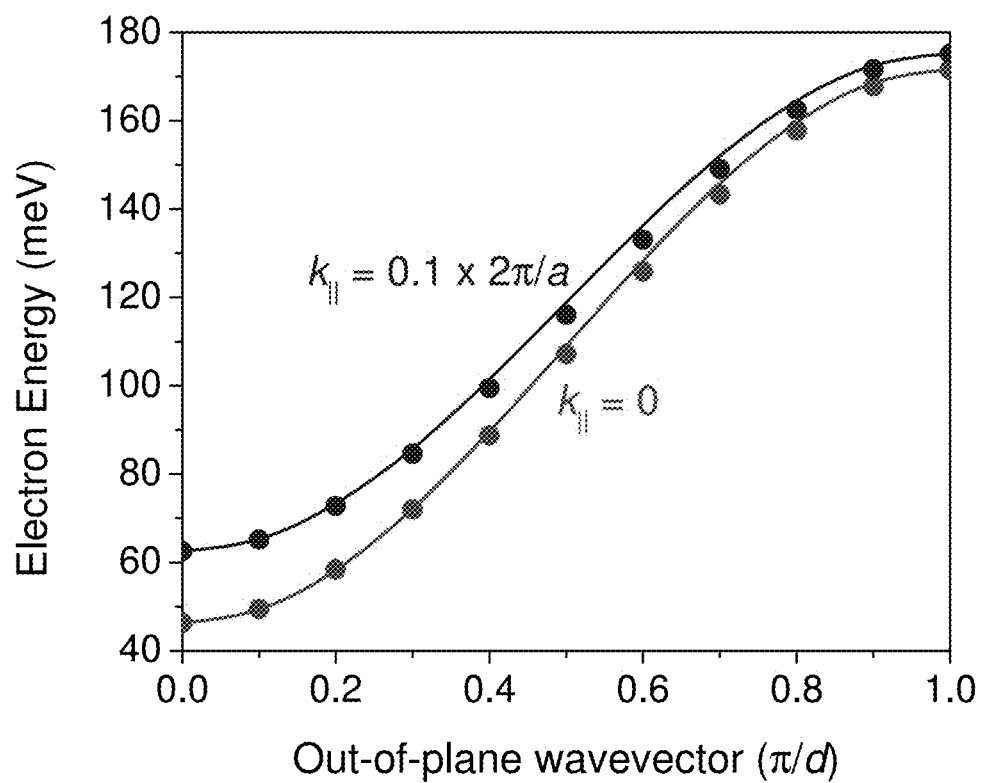
FIG. 1 contains plots of dispersions of the lowest conduction subband for an exemplary type-II superlattice.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a computationally efficient method for building a semiconductor superlattice or other quantum heterostructure that will improve the performance characteristics when incorporated into optoelectronic devices such as photodetectors, lasers, light emitting diodes, solar cells, thermophotovoltaics, etc.

In what follows, it will be understood that the term "superlattice" may also refer to other quantum heterostructures whose layering configuration is not necessarily repeated periodically.

The method includes determining the optoelectronic performance characteristics of a device configuration that incorporates one or more baseline semiconductor superlattices for which some or all of the relevant physical properties may be evaluated using two- or three-dimensional integrations in k-space that depend on k only via the electron and hole subband energies $E_n(k)$ and $E_m(k)$, respectively, and the optical matrix element M(k), revising the configuration of one of the one or more superlattices, re-evaluating the performance, comparing to the performance determined using the baseline, and replacing the revised superlattice configuration as the new baseline if its performance is superior. This procedure may be repeated for all of the one or more superlattices that are incorporated into the device configuration.

Various optoelectronic performance properties that may be evaluated and maximized using the methods of the invention may include, but are by no means limited to, the absorption coefficient $\alpha(\hbar\omega)$ of the absorbing superlattice in a photodetector or solar cell, the gain coefficient in a laser (as determined by the "negative" absorption coefficient), the radiative recombination lifetime or radiative efficiency, as related to the spontaneous radiative emission rate $R_{sp}$, and quantum well intersubband optical transition rates. All of these optoelectronic performance properties and many others also depend on the electron and hole densities and corresponding Fermi energy or quasi-Fermi energies, which may also be determined more efficiently using the invention.

In some embodiments, the invention may be used to make a superlattice for a photodetector or solar cell whose absorption coefficient is as large as possible. However, one skilled in the art will readily understand how the principles described herein can be used to evaluate, model, and maximize numerous other optoelectronic device properties that may have complex dependences on a variety of material properties. For example, rather than maximizing absorption, one can instead maximize a detector's quantum efficiency, which combines the absorption coefficient and superlattice absorber thickness with the efficiency of collecting carriers produced by the absorbed light. The collection efficiency depends on the minority-carrier diffusion length relative to the absorber thickness, which in turn depends on the minority-carrier mobility and minority-carrier lifetime. The radiative component of the carrier lifetime is derived from the spontaneous emission rate, while the radiative, Shockley-Read, and Auger are all sensitive to the spatial distributions of the electron and hole concentrations, and the minority-carrier mobility depends on the electron and hole densities.

We see that the net detector quantum efficiency depends on numerous physical effects, which can either be estimated crudely or evaluated with a high degree of rigor, depending on the level of detail one chooses to include and the approximations one chooses to employ. However, no matter what set of approximations is chosen, the invention can be used to evaluate the resulting dc device performance characteristics far more rapidly, so long as the integrals over k-space required to evaluate the relevant fundamental superlattice material properties depend on wavevector k only via the subband energies $E_n(k)$ and $E_m(k)$ and the optical matrix element M(k).

Less fundamental optoelectronic device characteristics that depend on the fundamental superlattice material properties may also be improved using the invention. The photodetector example may be taken a step further by choosing as the objective maximization of the detectivity performance characteristic, which depends on the dark current in addition to the quantum efficiency. The dark current is sensitive to various other properties such as the minority-carrier recombination lifetime, internal electric fields that depend on the spatial profile of the Fermi energy, and the carrier mobilities. Similarly, the quantum efficiency and energy conversion efficiency of a solar cell depend on a related set of properties, while the power conversion efficiency of a laser depends on a somewhat different set of superlattice material properties that can also be maximized much more rapidly using the invention.

Many of these device structures must be grown using a molecular beam epitaxy system or some other expensive and high-maintenance facility, besides which the processing and characterization of test devices is generally quite laborious. Therefore, it would be excessively costly to experimentally explore the very large parameter space of superlattice layering configurations that are possible. Instead, computer predictions of the expected device performance characteristics represent an important component of the optoelectronic device development efforts going on currently at commercial, university, and government facilities involved in the conception, development, and manufacturing of semiconductor optoelectronic devices. The numerical device performance evaluations rely on the accurate determination of such spatially-varying properties of one or more constituent superlattices as the band profiles, energy band alignments, wavefunction profiles, optical matrix elements, densities of states, carrier distributions, absorption coefficients, and radiative transition rates, so that an optimal superlattice layering configuration can be built using a computer. By reducing the typical computer run time required to perform the evaluations by a factor of 25 or more, one embodiment of the invention makes it much more practical to apply the evaluation and optimization procedure to many iterations of improved detector designs that would otherwise be unwieldy and impractical to perform. A very effective evaluation tool of this type is the NRL MULTIBANDS® software, which is now used (in the form of executable code) at several U.S. facilities to perform rapid state-of-the-art simulations of the performance characteristics for type-II III-V infrared photodetectors.

The invention is based, in part, on the observation that most or all of the physical properties affecting the performance characteristics of most semiconductor optoelectronic devices are expressible within mathematical models involving integrals over k-space whose dependence on wavevector k enters the integrands only via the electron and hole subband energies $E_n(k)$ and $E_m(k)$ and the optical matrix element $M(k)$. That is, most or all of the physical properties affecting the device performance characteristics either have the following form or depend in some functional way on fundamental properties A having the form:

$$A = B \sum_{n,m} \int_{-\pi/d}^{+\pi/d} \frac{dk_z}{2\pi} \int_0^{2\pi} d\varphi \quad (1)$$

$$\int_0^\infty \frac{k_\| dk_\|}{4\pi^2} g[E_m(k_z, k_\|, \varphi), E_n(k_z, k_\|, \varphi), M(k_z, k_\|, \varphi)],$$

where the sums are over conduction subbands n and valence subbands m. For properties having this form, the integrand $g(k)$ depends on the wavevector k only via the various electron and hole subband energies $E_m(k)$ and $E_n(k)$ and the optical matrix element $M(k)$ corresponding to the given superlattice layering configuration. In what follows, it is understood that other dependences on k that do not require diagonalization of the Hamiltonian may also be included in $g(k)$. In common practice, the subband energies and optical matrix element are derived by diagonalizing the Hamiltonian within a multi-band k·p formalism, tight-binding approximation, pseudopotential approximation, or some other band structure formalism known to the art.

In what follows, we will assume the three-dimensional form of k-space employed in Equation (1). However, it should be understood that the invention is also applicable to two-dimensional quantum heterostructures for which there is no significant dispersion along the $k_z$ axis. In that case, the generalized expression for a fundamental superlattice material property takes the form:

$$A = B' \sum_{n,m} \int_0^{2\pi} d\varphi \int_0^\infty \frac{k_\| dk_\|}{4\pi^2} g[E_m(k_\|, \varphi), E_n(k_\|, \varphi), M(k_\|, \varphi)], \quad (2)$$

One of the most important fundamental superlattice material properties having the form of Equation (1) is the optical absorption coefficient, $\alpha(\hbar \omega)$, which may be expressed in the form $$\alpha(\hbar\omega) = \quad (3)$$

$$\frac{4\pi^2 \alpha_0}{n_r} \frac{1}{\hbar\omega} \sum_{n,m} \int_{-\pi/d}^{+\pi/d} \frac{dk_z}{2\pi} \int_0^{2\pi} d\varphi \int_0^\infty \frac{k_\| dk_\|}{4\pi^2} |M(k)|^2 [f_m(E_m(k)) -$$

$$f_n(E_n(k))] L(E_n(k) - E_m(k) - \hbar\omega),$$

where $\hbar \omega$ is the photon energy of the light incident on the superlattice; $\alpha_0$ is the fine-structure constant; $n_r$ is the refractive index of the absorbing material; $|M|^2$ is the square of the optical matrix element given by $|\nabla_k H|^2$, where H is the band structure Hamiltonian; L is the lineshape function (see J. R. Meyer, C. A. Hoffman, F. J. Bartoli, and L. R. Ram-Mohan, "Type-II quantum well lasers for the mid-wavelength infrared", *Appl. Phys. Lett.*, vol. 67, pp. 757-759 (1995)), which depends on the difference between the electron energy $E_n$ and the hole energy $E_m$ at wavevector k; d is the superlattice period; and $f_n$ and $f_m$ are the electron and hole Fermi functions given by the following:

$$f_n(E_n(k)) = 1/(\exp((E_n(k) - E_{Fn})/k_B T) + 1)$$

$$f_m(E_m(k)) = 1/(E_{Fm} - \exp((E_m(k))/k_B T) + 1),$$

where for non-equilibrium statistics $E_{Fn}$ and $E_{Fm}$ are the electron and hole quasi-Fermi energies, whereas for equilibrium statistics a single Fermi energy $E_F$ is common to both ($E_{Fn} = E_{Fm} = E_F$). It is understood that other related expressions for the absorption coefficient $\alpha(\hbar \omega)$ may also be employed within the invention.

We emphasize that Equation (3) is a specific example of the more general form represented by Equation (1), since the two equations become equivalent when $$B = 4\pi^2 \alpha_0 / n_r \hbar \omega \text{ and}$$

$$g(E_m, E_n, M) = |M|^2 (f_m(E_m) - f_n(E_n)) L(E_n - E_m - \hbar \omega).$$

The same is true of the functional dependences of other important fundamental properties related to the performance characteristics of optoelectronic devices that incorporate semiconductor superlattices. A second example is the spontaneous radiative emission rate $R_{sp}$, which may be evaluated from the expression:

$$R_{sp} = \int d(\hbar\omega) \frac{4\alpha_0 n_r^2 \hbar\omega}{(\hbar c)^3} \sum_{n,m} \int_{-\frac{\pi}{d}}^{\frac{\pi}{d}} \frac{dk_z}{2\pi} \int_0^{2\pi} d\varphi \int_0^\infty \frac{k_\| dk_\|}{4\pi^2} [|M(k)|^2 * \quad (4)$$

$$[f_n(E_n(k))(1 - f_m(E_m(k)))] L(E_n(k) - E_m(k) - \hbar\omega)]$$

where c is the speed of light and all other symbols have the same meaning as in Equation (3). In this case, the symbol B in Equation (1) takes the form of an operator that combines various multiplicative physical constants with an integration over $d(\hbar \omega)$. Again, the key feature is that the integrand (in square brackets) depends on the wavevector k only via the various electron and hole subband energies, $E_m(k)$ and $E_n(k)$, and the optical matrix element $M(k)$.

A third example is the electron and hole densities and their relation to the Fermi level (for thermal equilibrium) or quasi-Fermi levels (for non-equilibrium conditions, such as when an electrical bias is applied or the superlattice is optically excited). The electron density may be obtained from the expression:

$$n = \sum_n \int_{-\frac{\pi}{d}}^{\frac{\pi}{d}} \frac{dk_z}{2\pi} \int_0^{2\pi} d\varphi \int_0^\infty \frac{k_\| dk_\|}{4\pi^2} f_n(E_n(k)) \quad (5)$$

which also has the form of Equation (1), except that there is no sum over hole subbands and it does not involve the optical matrix element. In evaluating the Fermi function, either the Fermi level is used for equilibrium conditions or the electron quasi-Fermi level is used for non-equilibrium conditions. The analogous expression for the hole density p simply sums over m instead of n and replaces $f_m(E_m(k))$ for $f_n(E_n(k))$ in Equation (5). If the carrier densities are known, for example from the doping level, one may also use Equation (5) and/or the analogous expression for the hole density to obtain the Fermi energy or quasi-Fermi energies. It should be understood in what follows that Equation (5) and the analogous expression for the hole concentration may be used to calculate carrier densities if the Fermi energy $E_F$ is known (for equilibrium statistics), or they may be used to calculate the Fermi energy if at least one carrier concentration is known. We will refer to these two circumstances interchangeably, since Equation (6) is used in either case and only the input information differs. The same is true for the concentration of a given carrier and its quasi-Fermi level in the case of non-equilibrium statistics.

Further examples include the optical gain in a laser (basically the negative of the absorption coefficient) and the absorption, gain, or spontaneous emission rate associated with intersubband rather than interband optical transitions.

Using numerical methods known in the art, an expression in the form of Equation (1) (and therefore Eqs. (2-5) as well) may be evaluated to any desired degree of accuracy by replacing the three-fold integral by finite sums over discrete intervals $\Delta k_z$, $\Delta k_{z1}$, and $\Delta \phi$, together with a weighting function w:

$$A = B \sum_{n,m} \sum_{p=1}^{P} \frac{\angle k_z}{2\pi} \sum_{q=1}^{Q} \Delta \varphi \sum_{r=1}^{R} \frac{k_{\|r} \angle k_{\|}}{4\pi^2} g[E_m(k_{zp}, k_{\|r}, \varphi_q), E_n(k_{zp}, k_{\|r}, \varphi_q), M(k_{zp}, k_{\|r}, \varphi_q)] w(p, q, r), \quad (6)$$

where $k_{zp}$, $\phi_q$, and $k_{\|r}$ are discrete values of each integration variable at which the integrand will be evaluated.

In a typical calculation of interest, the number of points used in evaluating the $k_z$ and $\phi$ summations are rather significant, requiring at least P=10 and Q=5, respectively. This means that in order to evaluate the triple integral, the function g(k) must be evaluated at a total of 50×R values of k, each of which requires substantial computing time to diagonalize the Hamiltonian. Consequently, nearly all of the computer run time required to evaluate the three-fold integral is consumed by the numerous evaluations of E(k) and M(k) at the various summation points in the numerical integration.

The present invention provides a method that allows one to make a superlattice that improves the performance characteristics of semiconductor optoelectronic devices much more quickly and efficiently, by substantially reducing the number of k values at which the diagonalization to obtain E(k) and M(k) must be performed. Using the method of the present invention, the number of diagonalizations is reduced to 2×R, for a typical savings of a factor of 25 in the computing speed required to perform each evaluation. This is accomplished by incorporating approximate, but very accurate, expressions for $E_n(k)$, $E_m(k)$, and M(k) into the summations of Equation (6), where the expressions for $E_n(k)$, $E_m(k)$, and M(k) only need to be evaluated at two values of $k_z$ and one value of $\phi$, rather than at all P×Q values that would normally be required.

Electron and Hole Energy Dispersions $E_n(k)$ and $E_m(k)$

As noted above, to substantially reduce the computer time required to perform the summation over p=1 to P (which accomplishes the integration over $dk_z$) in Equation (6), in accordance with the method of the present invention, the electron and hole energy dispersions $E_n(k_{zp}, k_{\|r}, \phi_q)$ and $E_m(k_{zp}, k_{\|r}, \phi_q)$ are evaluated using the approximate expression $$E_j(k_{zp}, k_{\|r}, \varphi_q) = E_j(k_z = 0, k_{\|r}, \varphi_q) + \frac{E_j(k_z = \pi/d, k_{\|r}, \varphi_q) - E_j(k_z = 0, k_{\|r}, \varphi_q)}{2}[1 - \cos(k_{zp}a)] \quad (7)$$

where j may be either n or m.

This cosine model is known to be sufficiently accurate for representing the energy dependence of the electron and hole states on $k_z$. See, e.g., L. Esaki, "Do-it-yourself quantum mechanics in low-dimensional structures," *Physica Scripta*, vol. T42, pp. 102-109, 1992. As an illustration, FIG. 1 plots the dispersions of the lowest conduction subband for the parallel in-plane wavevectors of $k_\| = 0$ and $k_\| = 0.01 \times 2\pi/a$, where a is the lattice constant. The calculation was performed on a type-II superlattice having the structure 39.7 Å InAs/27.6 Å $Ga_{0.88}In_{0.12}Sb$, which is typical of those used for LWIR detectors, at the typical detector operating temperature of T=77 K. The dispersion was calculated using the 8-band k·p method that is well known in the art. The results, shown by the data points and resulting curves in FIG. 1, show that at both values of km, the curves closely follow the cosine model. Since the dispersions of the valence subbands are usually weaker than those of the conduction subbands, the approximation of $E_m(k)$ for all k obtained by evaluating $k_z$ at only two values is generally even better when applied to valence subbands.

Optical Matrix Element M(k)

In order to take full advantage of the approximate approach to evaluating the energy dispersion along the $k_z$ axis (Equation (7)), in the method of the present invention, we also employ a corresponding approximate expression for the momentum matrix element, which allows M(k) for all k to be obtained by diagonalizing the Hamiltonian only at the same two end point values of $k_z = 0$ and $k_z = \pi/d$. To our knowledge, no such approximation has been reported previously.

We first note that in the limit of a quantum well, where both the electron and hole wavefunctions decay nearly to zero in the barrier, it is clear that neither the dispersion nor the optical matrix element can vary with $k_z$ because an arbitrary barrier thickness can be chosen without affecting the results. Although the dispersions in a typical type-I superlattice with electron and hole wavefunctions penetrating somewhat into the same barrier layers are not necessarily flat, the optical matrix element does not vary significantly with $k_z$ since the electron and hole wave functions have the same relative phase in the different regions.

However, it is less straightforward to model the behavior in an asymmetric type-II superlattice, since the peaks of the electron and hole wavefunctions are in adjacent layers (e.g., in the InAs and GaInSb layers of the example superlattice, respectively). The s component of the electron wave function, which is of primary interest for absorption near the energy gap, can be written as a Fourier expansion along the growth direction:

$$\Psi_s(r, z) = \sum_G \varphi_G e^{ik_\| r} e^{i(k_z + G)z} \quad (8)$$

where $G = 2\pi l/d$, $l = 0, \pm 1, \pm 2 \ldots$. It is easy to see that the sign of the wave function for $k_z = \pm \pi/d$ flips in the neighboring periods, i.e., when $\Delta z = d$. The same happens to the $p_x$ and $p_y$ components of the heavy-hole wave function that enter the optical matrix element, although in that case the layer where the heavy-hole wave function has its peak represents a barrier for electrons. Since the sign of the electron wave function flips in the next period, it must have a node and be antisymmetric with respect to the center of the GaInSb layer. On the other hand, the heavy-hole wave function has an anti-node and is symmetric in the same layer. We conclude that for a two-layer type-II superlattice with pure components, the wave function overlap, and hence the optical matrix element, must vanish at the zone edge ($k_z = \pm \pi/d$).

Figure 2:
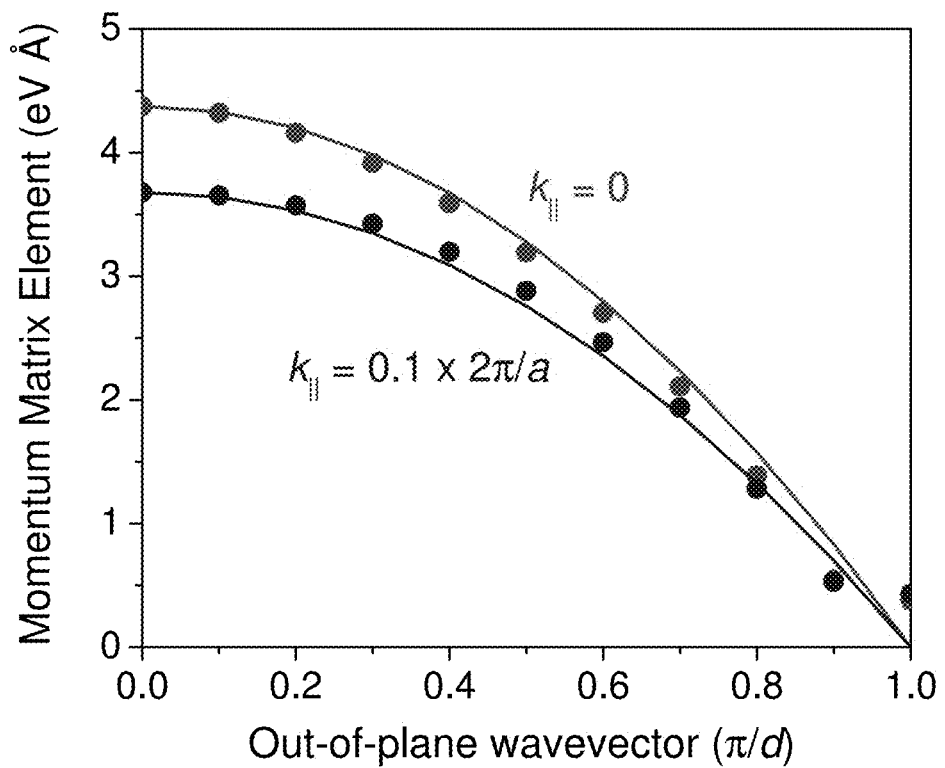
FIG. 2 contains plots of the 8-band k·p calculation of the optical matrix element for the same type-II superlattice considered in FIG. 1, as a function of $k_z$ for two different in-plane wavevectors $k_\parallel$.

We have confirmed this behavior more rigorously by performing an 8-band k·p calculation, even though the matrix elements never vanish entirely at $k_z = \pm \pi/d$ due to mixing of the s and $p_z$ components of the wavefunctions. FIG. 2 illustrates the dependence of the momentum matrix element on $k_z$ at the same two in-plane wave vectors of $k_\| = 0$ and $k_\| = 0.01 \times 2\pi/d$, for the same type-II superlattice considered in FIG. 1. The data points in FIG. 2 are results for the optical matrix element M(k) obtained using the 8-band k·p calculation, while the curves represent the following interpolation between the two end points:

$$|M(k_z, k_\|, \phi)| = |M(k_z = 0, k_\|, \phi)|(1 - k_z^2 d^2) \quad (9)$$

While this approximation for the optical matrix element |M(k)| is accurate in the case of type-II superlattices, it cannot be used more generally because such an interpolation is incompatible with the behavior expected for a quantum well or type-I superlattice. To assure that all superlattices and quantum wells are treated within a single evaluation method, in accordance with the present invention, |M(k)| is approximated as follows:

$$|M(k_z, k_\|, \varphi)| = \quad (10)$$
$$|M(k_z = 0, k_\|, \varphi)| - \left[|M(k_z = 0, k_\|, \varphi)| - \left|M\left(k_z = \frac{\pi}{d}, k_\|, \varphi\right)\right|\right] k_z^2 d^2.$$

Equation (10) is consistent with the type-II expression given in Equation (10), because the matrix element vanishes when $k_z = \pm \pi/d$. In addition, it is appropriate to the type-I and simple quantum well cases because the matrix elements are then nearly equal for $k_z = 0$ and $k_z = \pm \pi/d$. This means that Equation (10) is fully consistent with both type-I and type II superlattices and quantum wells having all possible geometries.

Moreover, we have confirmed that Equation (10) remains reliable when applied to more complex multi-layer structures such as the symmetric four-constituent type-II "W" configuration (e.g., InAs/GaInSb/InAs/AlSb as in E. H. Aifer, J. G. Tischler, J. H. Warner, I. Vurgaftman, W. W. Bewley, J. R. Meyer, J. C. Kim, L. J. Whitman, C. L. Canedy and E. M. Jackson, "W-structured type-II superlattice long-wave infrared photodiodes with high quantum efficiency," *Appl. Phys. Lett.* 89, 053519 (2006)). In that case the electron wave function changes sign in the AlSb barrier, and the optical matrix element does not change significantly between the zone center ($k_z = 0$) and the zone edge ($k_z = \pm \pi/d$).

Equation (10) also produces reasonably accurate results for even more complicated superlattice geometries, e.g., cases where the hole wave function is not perfectly centered in the hole quantum well. We are not aware of any previous publication or discussion of this method for approximating the optical matrix element as a function of $k_z$ in a superlattice, which allows it to be approximated accurately based on evaluation only at its end-point values.

We incorporate this new expression into the invention by evaluating the optical matrix element $M(k_{zp}, k_{\|r}, \phi_q)$ appearing in Equation (6) using the approximate form:

$$|M(k_{zp}, k_{\|r}, \varphi_q)| = |M(k_z = 0, k_{\|r}, \varphi_q)| - \quad (11)$$
$$\left[|M(k_z = 0, k_{\|r}, \varphi_q)| - \left|M\left(k_z = \frac{\pi}{d}, k_{\|r}, \varphi_q\right)\right|\right] k_z^2 d^2.$$

When Equations (7) and (11) are both used, all of the values of $E_n(k_{zp}, k_{\|r}, \phi_q)$, $E_m(k_{zp}, k_{\|r}, \phi_q)$, and $M(k_{zp}, k_{\|r}, \phi_q)$ required to evaluate Equation (6) may be accurately approximated following diagonalization of the Hamiltonian at only two $k_z$ points (not corresponding to any of the $k_{zp}$ values used in the summation) for each $k_{\|r}$ and $\phi_q$, namely at $k_z = 0$ and at $k_z = \pi/d$. This leads to a very large savings in computer run time over the conventional procedure, in which the Hamiltonian must be diagonalized at P different values of $k_{zp}$ in order to evaluate Equation (6). The savings is a factor of P÷2, which for the typical P value of 10 is a factor of 5.

Angular Direction in Plane dϕ

The invention also teaches a much more rapid means for evaluating the summation q=1 to Q (which accomplishes the integration over dϕ) in Equation (6). This is because the method of the invention evaluates the integrand $g[E_m(k_{zp}, k_{\|r}, \phi_q), E_n(k_{zp}, k_{\|r}, \phi_q), M_m(k_{zp}, k_{\|r}, \phi_q)]$ at only one angle ϕ, rather than at all of the angles $\phi_q$ corresponding to q=1 to Q.

We first note that the in-plane dispersions of any zincblende superlattice are eightfold degenerate, i.e., only the angles between ϕ=0° and 45° need be considered. Various published works (e.g., P. F. Qiao, S. Mu, and S. L. Chuang, "Electronic band structures and optical properties of type-II superlattice photodetectors with interfacial effect," *Opt. Express* 20, 2319 (2012)) point out that to accurately evaluate the absorption coefficient (the same considerations apply to evaluations of $R_{sp}$ and any other fundamental property having the form of Equation (1)), it is important to integrate over the in-plane angular directions corresponding to ϕ=0 to 45°. This is primarily because the density of states (DOS) in the heavy-hole subband increases as the angle approaches ϕ=45°, accompanied by a smaller variation in the optical matrix element. That is, the in-plane mass (and joint DOS) are lowest in the ϕ=0° direction and heaviest (largest) at ϕ=45°.

A common approximation is to evaluate the DOS and matrix element at the in-plane wavevector along the x axis, i.e., at ϕ=0°. However, in accordance with the present invention, more accurate results can be obtained by determining and evaluating the integrand at the single most "representative" in-plane angular direction, $\phi_{rep}$, which leads to the most accurate result for the full 2D in-plane integration.

Thus, in accordance with the present invention, by employing the form $$g[E_m(k_{zp}, k_{\|r}, \phi_{rep}), E_n(k_{zp}, k_{\|r}, \phi_{rep}), M_m(k_{zp}, k_{\|r}, \phi_{rep})]$$

in Equation (6), the Hamiltonian need be diagonalized at only one value of ϕ for each $k_{zp}$ and $k_{\|r}$, rather than at all Q of the different values in the summation. This speeds up the computation while maintaining high accuracy in evaluating a given device's performance characteristics.

Figure 3:
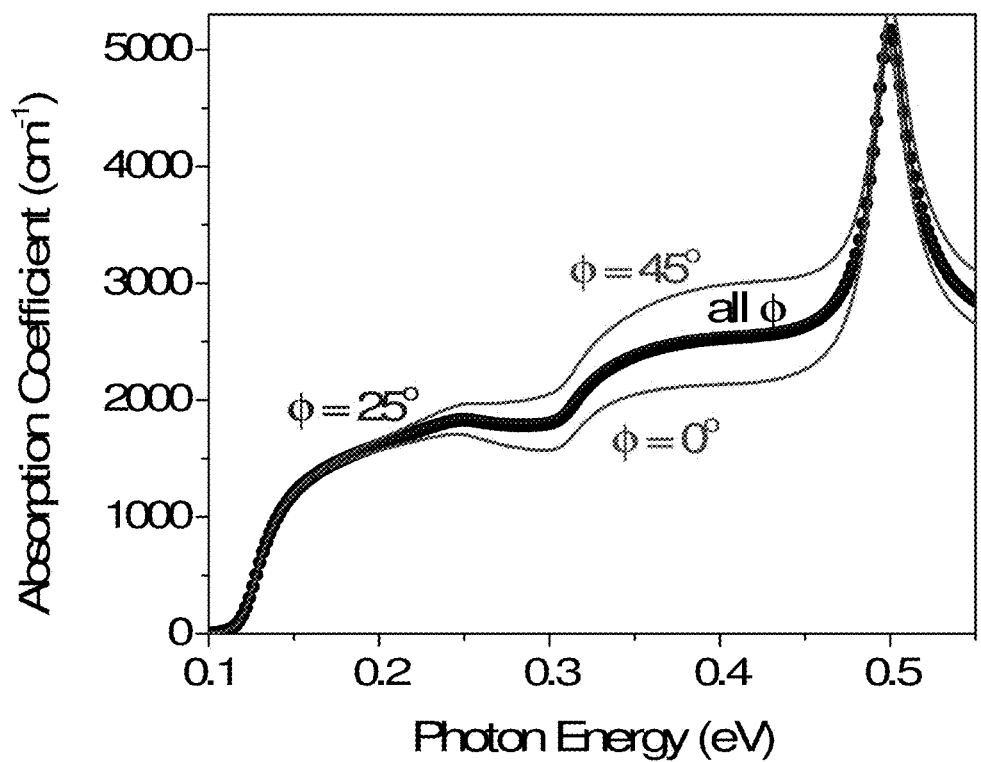
FIG. 3 contains plots of the absorption coefficient as a function of photon energy, as calculated for the full integration over all angles and for single angular directions of 0°, 25°, and 45°.

The points in FIG. 3 illustrate a typical calculated absorption coefficient as a function of photon energy (for the same type-II superlattice considered in FIG. 1 and FIG. 2), as derived from the full integration over all in-plane directions. Also shown as curves are the spectra obtained when the energies and matrix elements in Equation (6) are evaluated only at three selected single directions: ϕ=0° (red), ϕ=45° (green), and at the most representative value of ϕ=$\phi_{rep}$=25° (blue). Although the choices of ϕ=0° or ϕ=45° yield absorption coefficients that are too low or too high, respectively, since the DOS for those angles are either lower or higher than the average, near the energy gap the curve corresponding to $\phi=25°$ differs by at most 1% from the more rigorous value, and the error is at most ~2% at higher energies. In most cases of interest, these errors will be small compared to those associated with uncertainties in the band parameters (such as the matrix elements in bulk materials) and inaccuracies resulting from the lack of full rigor in the 8-band k·p (or any other practical) description of the band structure. The magnitude of the errors introduced by the approximations employed by the present invention should therefore be viewed as quite acceptable.

Thus, in accordance with the present invention, the functions $E_m(k)$, $E_m(k)$, and $M_m(k)$ need only be approximated for a single value of $\phi$, $\phi=25°$, where $E_m(k)$ and $E_n(k)$ are approximated as $$E_j(k_{zp}, k_{\|r}, 25°) = E_j(k_z = 0, k_{\|r}, 25°) +$$
$$\frac{E_j(k_z = \pi/d, k_{\|r}, 25°) - E_j(k_z = 0, k_{\|r}, 25°)}{2}[1 - \cos(k_{zp}a)]$$

and $M_m(k)$ is approximated as $$|M(k_{zp}, k_{\|r}, 25°)| = |M(k_z = 0, k_{\|r}, 25°)| -$$
$$\left[|M(k_z = 0, k_{\|r}, 25°)| - \left|M\left(k_z = \frac{\pi}{d}, k_{\|r}, 25°\right)\right|\right]k_{zp}^2 d^2.$$

These approximations for $E_m(k)$, $E_n(k)$, and $M_m(k)$ are then used in Equation (6) to find one or more material properties $A_i$ generalized in Equation (1) above, e.g., to find the absorption coefficient $\alpha(\hbar\omega)$ (Equation (3)), the radiative coefficient $R_{sp}$ (Equation (4)) or the electron density n (Equation (5)).

We also note that the method for building a semiconductor superlattice layering configuration for optimizing the performance characteristics of optoelectronic devices in accordance with the present invention includes a step of the computer receiving data of the band parameters for the constituent materials that form the semiconductor superlattice. These may be taken from any suitable source of semiconductor band parameters, such as Vurgaftman et al., "Band Parameters for III-V Compound Semiconductors and Their Alloys," *Journal of Applied Physics* 89, 5815 (2001), the entirety of which is hereby incorporated by reference into the present disclosure.

The method of the invention builds a semiconductor superlattice that maximizes a chosen performance characteristic for a chosen optoelectronic device. In some cases, that performance characteristic will correspond to the value of a single fundamental property, such as making the absorption coefficient, $\alpha(\hbar\omega)$, in the absorber region of a photodetector or solar cell as large as possible. In other cases, however, the chosen performance characteristic will depend in a more complicated way on one or more fundamental properties having the form of Equation (1).

For example, as discussed above, maximizing a photodetector's quantum efficiency depends not only on the absorption coefficient, but also on the efficiency of collecting the carriers produced by the absorbed light. The collection efficiency depends on the minority-carrier diffusion length relative to the absorber thickness, which in turn depends on the minority-carrier lifetime. All of the lifetime components depend on the electron and hole carrier concentrations n and p (the fundamental properties specified by Equation (5) for electrons and the analogous expression for holes), while the radiative lifetime also depends on the spontaneous emission rate, the fundamental property specified by Equation (4). The minority-carrier diffusion length also depends on the minority-carrier mobility, which depends on the carrier concentrations n and p. Clearly the photodetector quantum efficiency has a complicated functional relationship to other properties, whose evaluation requires the calculation of at least four fundamental properties ($\alpha$, $R_{sp}$, n, and p) that may all be determined from expressions having the form of Equation (1).

We may summarize this type of complicated dependence of a given optoelectronic device performance characteristic F on other properties using the general form $F(A_1, A_2, A_3, \ldots)$, where each of the fundamental properties $A_i$ has the form of Equation (1). Some of the fundamental properties $A_i$ may appear in the function F directly, while others appear only through a dependence of F on other, dependent properties $G(A_i, \ldots), H(A_i, \ldots), \ldots$.

An example is the dependence of photodetector quantum efficiency (QE) on the fundamental property radiative emission rate $R_{sp}$ through the radiative component of the minority-carrier lifetime $\tau_R$. The QE also depends on the fundamental properties n and p through the absorption coefficient, the radiative, Shockley-Read ($\tau_{SR}$), and Auger ($\tau_A$) lifetime components, and the minority-carrier mobility ($\mu_i$). So in this example, the quantum efficiency may be written in the general functional form: $F(A_1, A_2, A_3, \ldots) = QE(\alpha, \tau_R, \tau_{SR}, \tau_A, \mu_i, \ldots)$, where $\tau_R$, $\tau_{SR}$, $\tau_A$, and $\mu_i$ depend on the fundamental properties n, p, and $R_{sp}$. Still other fundamental and dependent properties may enter the expression as well, depending on the range of physical processes one chooses to incorporate into the evaluation. The invention may be applied regardless of whether the functional dependence F, and the approximations employed to evaluate the various fundamental properties $A_1, A_2, A_3, \ldots$ and dependent properties $G(A_i, \ldots), H(A_i, \ldots), \ldots$ that F depends on, represent simplified approximations or very complex relationships that rigorously incorporate a variety of physical mechanisms governing the optoelectronic device operation. In all cases, the invention makes the process of building a superlattice to maximize the performance characteristic F much more rapid, so long as F depends, either directly or via a dependent property, on at least one fundamental property A, that has the functional form of Equation (1).

In one embodiment, the present invention provides a method for building a semiconductor superlattice or other quantum heterostructure that maximizes a chosen performance characteristic of an optoelectronic device whose performance is influenced by the material characteristics resulting from the layering configuration of the superlattice. The superlattice layering configuration is comprised of: (1) the number of ordered layers in each period of the multi-period structure, or the total number of ordered layers in a structure that does not have multiple periods, (2) the thickness of each ordered layer, and (3) the constituent material forming each ordered layer. The constituent material forming a given layer may be an elemental or binary semiconductor or other material, an alloy with a variable alloy composition, an amorphous material or alloy, a material with lateral structuring such as self-assembled quantum dots, or one of numerous other possible material constituents known to the art.

The method for building the superlattice layering configuration that maximizes the chosen optoelectronic device performance characteristic includes the steps of:

(1) receiving, at a computer, data of a first baseline semiconductor superlattice, whose layering configuration is defined by the number of layers (total, or in each period), thickness of each layer, and constituent material forming each layer as described in above;

(2) receiving, at the computer, data of the band parameters for all the constituent materials that form each layer of the semiconductor superlattice, as described above;

(3) using the computer, identifying a first fundamental physical property $A_1$ that is determined by a three-dimensional integral over k-space having the form:

$$A_i = B_i \sum_{n,m} \int_{-\pi/d}^{+\pi/d} \frac{dk_z}{2\pi} \int_0^{2\pi} d\varphi \int_0^{\infty} \frac{k_\| dk_\|}{4\pi^2} g_i[E_m(k_z, k_\|, \varphi), E_n(k_z, k_\|, \varphi), M(k_z, k_\|, \varphi)], \quad (12)$$

with the various quantities defined as described above regarding Equation (1), and with i=1. The integrand $g_i(k)$ must depend on the wavevector k only via the electron and hole subband energies, $E_n(k)$ and $E_m(k)$, the optical matrix element $M(k)$, and other possible dependences on k that do not require diagonalization of the band structure Hamiltonian.

(4) using numerical procedures known in the art, replacing the three-fold integral in Equation (12) by finite sums over discrete intervals $\Delta k_z$, $\Delta k_\|$, and $\Delta\varphi$, together with a weighting function w:

$$A_i = B_i \sum_{n,m} \sum_{p=1}^{P} \frac{\triangle k_z}{2\pi} \sum_{q=1}^{Q} \triangle \varphi \sum_{r=1}^{R} \frac{k_{\|r} \triangle k_\|}{4\pi^2} g_i[E_m(k_{zp}, k_{\|r}, \varphi_q), E_n(k_{zp}, k_{\|r}, \varphi_q), M(k_{zp}, k_{\|r}, \varphi_q)] w(p, q, r), \quad (13)$$

where $k_{zp}$, $\varphi_q$, and $k_{\|r}$ are discrete values of each integration variable at which the integrand will be evaluated, and with i=1.

(5) using the computer, replacing all the $\varphi_q$ values appearing in Equation (13) by the single representative angle $\varphi_{rep}$=25°, such that the equation becomes:

$$A_i = B_i \sum_{n,m} \sum_{p=1}^{P} \frac{\triangle k_z}{2\pi} \sum_{q=1}^{Q} \triangle \varphi \sum_{r=1}^{R} \frac{k_{\|r} \triangle k_\|}{4\pi^2} g_i[E_m(k_{zp}, k_{\|r}, 25°), E_n(k_{zp}, k_{\|r}, 25°), M(k_{zp}, k_{\|r}, 25°)] w(p, q, r), \quad (14)$$

with i=1.

(6) using the computer, evaluating $E_n(k_{zp}, k_{\|r}, 25°)$ and $E_m(k_{zp}, k_{\|r}, 25°)$ in Equation (13) using the expression:

$$E_j(k_{zp}, k_{\|r}, 25°) = E_j(k_z = 0, k_{\|r}, 25°) + \frac{E_j(k_z = \pi/d, k_{\|r}, 25°) - E_j(k_z = 0, k_{\|r}, 25°)}{2}[1 - \cos(k_{zp}a)] \quad (15)$$

where j may be either n or m. The quantities $E_n(k_z=0,k_{\|r},25°)$, $E_m(k_z=0,k_{\|r},25°)$, $E_n(k_z=\pi/d,k_{\|r},25°)$, and $E_m(k_z=\pi/d,k_{\|r},25°)$ are determined by diagonalizing the band structure Hamiltonian using the k·p method or some other suitable technique known to those skilled in the art.

(7) using the computer, evaluating $M(k_{zp},k_{\|r},25°)$ in Equation (13) using the expression:

$$|M(k_{zp}, k_{\|r}, 25°)| = |M(k_z = 0, k_{\|r}, 25°)| - \left[|M(k_z = 0, k_{\|r}, 25°)| - \left|M\left(k_z = \frac{\pi}{d}, k_{\|r}, 25°\right)\right|\right]k_{zr}^2 d^2 \quad (16)$$

where the quantities $|M(k_z=0,k_{\|r},25°)|$ and $|M(k_z=\pi/d,k_{\|r},25°)|$ are determined from the same diagonalizations of the Hamiltonian that provided the determinations of $E_n$ and $E_m$ at the given $k_z$ and $\varphi$ values in step (6).

(8) optionally, using the computer, identifying a second fundamental physical property, $A_2$, that is also determined by a three-dimensional integral over k-space having the form of Equation (12), with i=2.

(9) using numerical procedures known in the art, using the computer, replacing the three-fold integral in Equation (12) by finite sums over discrete intervals as in Equation (13) with i=2.

Repeat steps (4)-(6) to evaluate the summations in Equation (13) with i=2.

(10) optionally, using the computer, identifying additional fundamental physical properties, $A_3$, $A_4$, . . . that are also determined by three-dimensional integrals over k-space having the form of Equation (12), with i=3, 4, . . . . Follow the procedures of step (8) to evaluate the summations in Equation (13) for each additional property $A_i$.

(11) using the computer, evaluating a chosen optoelectronic device performance characteristic F that depends on one or more fundamental physical properties $A_1$, $A_2$, $A_3$, . . . having the functional form of Equation (1). The dependence of $F(A_1, A_2, A_3, \ldots)$ on the fundamental physical properties $A_1$, $A_2$, $A_3$, . . . may be either direct or through dependent properties $G(A_i, \ldots)$, $H(A_i, \ldots)$, . . . , as described in paragraph [030] above. The values for the fundamental physical properties $A_1$, $A_2$, $A_3$, . . . are taken from the evaluations obtained in steps (3)-(10).

(12) using the computer, modifying one or more parameters in the layering configuration of the baseline superlattice structure to obtain a modified superlattice structure.

Repeat steps (2)-(11) to evaluate the optoelectronic performance characteristic F for the modified superlattice.

(13) if the value of F obtained for the modified superlattice is superior to that for the baseline superlattice, substituting the modified superlattice layering configuration as the new baseline; and

(14) repeating steps (12) and (13) until convergence to an optimal value of the performance characteristic F is reached. The baseline superlattice employed to obtain that value of F then represents the superlattice layering configuration that best optimizes the performance characteristic F.

In another embodiment, the present invention provides a method for building a semiconductor quantum heterostructure that maximizes a chosen optoelectronic device performance characteristic that depends on one or more fundamental physical properties $A_1$, $A_2$, $A_3$, . . . whose functional form involves two-dimensional integrals in k-space, since there is no significant dispersion along the $k_z$ axis. That is, the one or more fundamental physical properties have the functional form of Equation (2).

In this case, the method for building the quantum heterostructure layering configuration that maximizes the chosen optoelectronic device performance characteristic includes the steps of:

(1a) receiving, at a computer, data of a first baseline semiconductor superlattice, whose layering configuration is defined by the total number of layers, thickness of each layer, and constituent material forming each layer as described above;

(2a) receiving, at the computer, data of the band parameters for all the constituent materials that form each layer of the semiconductor superlattice, as described above;

(3a) using the computer, identifying a fundamental physical property $A_1$ that is determined by a two-dimensional integral over k-space having the form:

$$A_i = B_i \sum_{n,m} \int_0^{2\pi} d\varphi \int_0^\infty \frac{k_\| dk_\|}{4\pi^2} g_i[E_m(k_\|, \varphi), E_n(k_\|, \varphi), M(k_\|, \varphi)], \quad (17)$$

with the various quantities defined as described above regarding Equation (1), and with i=1. The integrand $g_i(k)$ must depend on the wavevector k only via the electron and hole subband energies, $E_n(k)$ and $E_m(k)$, the optical matrix element M(k), and other possible dependences on k that do not require diagonalization of the band structure Hamiltonian.

(4a) using numerical procedures known in the art, replacing the two-fold integral in Equation (17) by finite sums over discrete intervals $\Delta k_\|$, and $\Delta \phi$, together with a weighting function w:

$$A_i = B_i \sum_{n,m} \sum_{q=1}^Q \angle \varphi \sum_{r=1}^R \frac{k_{\|r} \triangle k_\|}{4\pi^2} g_i[E_m(k_{\|r}, \varphi_q), E_n(k_{\|r}, \varphi_q), M(k_{\|r}, \varphi_q)]w(q, r), \quad (18)$$

where $\phi_q$, and $k_{|r}$ are discrete values of each integration variable at which the integrand will be evaluated, and with i=1.

(5a) using the computer, replacing all the $\phi_q$ values appearing in Equation (13) by the single representative angle $\phi_{rep}=25°$, such that the equation becomes:

$$A_i = B_i \sum_{n,m} \sum_{q=1}^Q \angle \varphi \sum_{r=1}^R \frac{k_{\|r} \triangle k_\|}{4\pi^2} \quad (19)$$

$$g_i[E_m(k_{\|r}, 25°), E_n(k_{\|r}, 25°), M(k_{\|r}, 25°)]w(q, r),$$

with i=1.

(6a) optionally, using the computer, identifying a second fundamental physical property, $A_2$, that is also determined by a two-dimensional integral over k-space having the form of Equation (17), with i=2. Following conventional numerical procedures, replace the two-fold integral in Equation (17) by finite sums over discrete intervals as in Equation (18) with i=2. Repeat step (4a) to evaluate the summations in Equation (18) with i=2.

(7a) optionally, using the computer, identifying additional fundamental physical properties, $A_3$, $A_4$, . . . that are also determined by two-dimensional integrals over k-space having the form of Equation (17), with i=3, 4, . . . . Follow the procedures of step (5a) to evaluate the summations in Equation (18) for each additional property $A_i$.

(8a) using the computer, evaluating a chosen optoelectronic device performance characteristic F that depends on one or more fundamental physical properties $A_1$, $A_2$, $A_3$, . . . having the functional form of Equation (2). The dependence of $F(A_1, A_2, A_3, \ldots)$ on the fundamental physical properties $A_1$, $A_2$, $A_3$, . . . may be either direct or through dependent properties $G(A_i, \ldots)$, $H(A_i, \ldots)$, . . . , as described above. The values for the fundamental physical properties $A_1$, $A_2$, $A_3$, . . . are taken from the evaluations obtained in steps (3a)-(7a).

(9a) using the computer, modifying one or more parameters in the layering configuration of the baseline superlattice structure to obtain a modified superlattice structure. Repeat steps (2a)-(8a) to evaluate the optoelectronic performance characteristic F for the modified superlattice.

(10a) if the value of F obtained for the modified superlattice is superior to that for the baseline superlattice, substituting the modified superlattice layering configuration as the new baseline.

(11a) repeating steps (9a) and (10a) until convergence to an optimal value of the performance characteristic F is reached. The baseline superlattice employed to obtain that value of F then represents the superlattice layering configuration that best optimizes the performance characteristic F.

ADVANTAGES AND NEW FEATURES

The main advantage of the methods disclosed in this invention is that they considerably reduce the computer run time required to build a superlattice layering configuration that optimizes a chosen optoelectronic device performance characteristic, so long as that characteristic depends on one or more fundamental properties having the form of Equation (1) or Equation (2), as is most commonly the case for real devices and performance characteristics. The more conventional alternative, which consumes far more computer run time, is to separately evaluate the energies and optical matrix element at each individual point in the integrations over $dk_z$ and $d\phi$. Some other works in the literature neglect the $k_z$ dependence entirely because the integrations consume too much time. Whereas previous algorithms may have used Equation (7) to approximate the energy dispersions vs. $k_z$, we are not aware of any previous use of Equation (10) to accurately approximate the optical matrix element at a given point in k-space. Past works that used a single point to approximate the $d\phi$ integral have most often chosen $\phi=0°$, which is seen in FIG. 3 to introduce considerable inaccuracy. Since most of the computational run time is spent on diagonalizations of the Hamiltonian rather than on the integrations themselves, the invention substantially improves the speed and practicality of such methods for improving optoelectronic device performance.

A representative savings in run time may be on the order of a factor of 25, since typically the summation to evaluate the integral over $dk_z$ requires P=10 summation points and the summation to evaluate the integral over $d\phi$ requires Q=5 summation points, for a total of $P \times Q \times R \approx 50 \times R$ total summation points at which the Hamiltonian must be diagonalized. With the invention, for each of the R summation points required to evaluate the integral over dkM, the Hamiltonian must be diagonalized at only 2 points in $k_z$ (0 and $\pi$) and only one point in $\phi(25°)$. Therefore, the total number of diagonalizations is typically only $2 \times R$, a reduction by a factor of 25. In cases where a finer grid in $dk_z$ and $d\phi$ is needed to assure sufficient accuracy, the savings will be even greater.

To our knowledge, the methods to treat the in-plane dispersion and the growth-direction variation of the optical matrix element have never been discussed previously in the patent or research literature. We also emphasize that whereas the components of the invention associated with integrations over the growth direction $dk_z$ are most advantageous when applied to type-II superlattices and other quantum structures with asymmetric electron and hole confinement, the component of the invention associated with the in-plane integration over $d\phi$ is equally advantageous for both type-I and type-II structures.

Thus, the present invention will substantially reduce the computer run time required to accurately evaluate multiple performance characteristics for a wide variety of optoelectronic devices that employ semiconductor superlattices and quantum well layered heterostructures. Once the invention has been used to build the most promising superlattice layering configuration on the computer, the resulting structure can be grown, processed, and tested in the laboratory. Experimental feedback from the testing may be incorporated into improved input data sets for the constituent material properties and physical processes governing the device operation, so that the invention can then be used to build a next generation of improved superlattice layering configurations.

ALTERNATIVES

We note that whereas expressions somewhat different from Equation (3) for the absorption coefficient, Equation (4) for the radiative emission rate and Equation (5) for the electron concentration may sometimes be employed in order to further refine the treatment of complex physical processes, the invention will apply to those variant expressions as long as the integrands of the two-dimensional or three-dimensional k-space integrals depend on k only via the subband energies, the optical matrix element, and other possible dependences that do not require diagonalization of the Hamiltonian, as in the generic Equations (1) and (2).

For some applications, rather than using $\phi_{rep}=25°$, other values of in the range 20-30° may provide sufficient accuracy.

Although particular embodiments, aspects, and features have been described and illustrated, it should be noted that the invention described herein is not limited to only those embodiments, aspects, and features, and it should be readily appreciated that modifications may be made by persons skilled in the art. The present application contemplates any and all modifications within the spirit and scope of the underlying invention described and claimed herein, and all such embodiments are within the scope and spirit of the present disclosure.

What is claimed is:

1. A method for building the superlattice layering configuration that maximizes the chosen optoelectronic device performance characteristic includes the steps of:

(1) receiving, at a computer, data of a first baseline semiconductor superlattice, whose layering configuration is defined by the number of layers (total, or in each period), thickness of each layer, and constituent material forming each layer as described in above;

(2) receiving, at the computer, data of the band parameters for all the constituent materials that form each layer of the semiconductor superlattice, as described above;

(3) using the computer, identifying a fundamental physical property of the semiconductor superlattice that is determined by a three-dimensional integral over k-space having the form:

$$A_i = B_i \sum_{n,m} \int_{-\pi/d}^{+\pi/d} \frac{dk_z}{2\pi} \int_0^{2\pi} d\varphi \int_0^\infty \frac{k_\| dk_\|}{4\pi^2} g_i[E_m(k_z, k_\|, \varphi), E_n(k_z, k_\|, \varphi), M(k_z, k_\|, \varphi)],$$

where:

$A_i$ represents any one of a plurality of fundamental physical properties of the semiconductor superlattice and where $A_i$, i=1, denotes a first fundamental physical property, $B_i$ is a constant included in the fundamental physical property $A_i$, n and m, respectively, specify conduction and valence subbands of a band structure of the semiconductor superlattice corresponding to the superlattice layering configuration; and g(k) is an integrand that depends on a wavevector k only via electron and hole subband energies $E_n(k)$ and $E_m(k)$ and an optical matrix element M(k) corresponding to the superlattice layering configuration, where $E_n(k)$ and $E_m(k)$, respectively, are electron and hole energy dispersions of the superlattice and k is a wavevector of the energy dispersions having a linear component $k_z$ parallel to a growth direction of the semiconductor superlattice, a linear component in a plane perpendicular to the growth direction of the semiconductor superlattice, and an angular component $\phi$ in a direction of an azimuthal angle in the plane perpendicular to the growth direction;

(4) using the computer, replacing the three-dimensional integral by finite sums over discrete intervals $\Delta k_z$, $\Delta k_\|$, and $\Delta\phi$, together with a weighting function w, such that $$A_i = B_i \sum_{n,m} \sum_{p=1}^{P} \frac{\Delta k_z}{2\pi} \sum_{q=1}^{Q} \Delta\varphi \sum_{r=1}^{R} \frac{k_{\|r} \Delta k_\|}{4\pi^2} g_i[E_m(k_{zp}, k_{\|r}, \varphi_q), E_n(k_{zp}, k_{\|r}, \varphi_q), M(k_{zp}, k_{\|r}, \varphi_q)]w(p, q, r)$$

where i=1, $k_{zp}$, $\phi_q$, and $k_{\|r}$ are discrete values of each integration variable at which the integrand will be evaluated, where p is a summation index referring to discrete value of $k_z$ and P is a total number of the values of $k_z$, q is a summation index referring to discrete values of $\phi$ and Q is the total number of these values, r is a summation index referring to discrete values of $k_\|$ and R is the total number of these values; and w is a weighting function assigning a weight to each of the summation indices p, q, and r;

(5) using the computer, replacing all the $\phi_q$ values with a single representative angle $\phi_{rep}=25°$ so that the summation becomes $$A_i = B_i \sum_{n,m} \sum_{p=1}^{P} \frac{\triangle k_z}{2\pi} \sum_{q=1}^{Q} \triangle \varphi \sum_{r=1}^{R} \frac{k_{\|r}\triangle k_{\|}}{4\pi^2} g_i[E_m(k_{zp}, k_{\|r}, 25°), E_n(k_{zp}, k_{\|r}, 25°), M(k_{zp}, k_{\|r}, 25°)]w(p, q, r)$$

where i=1;

(6) using the computer, evaluating $E_n(k_{zp},k_{\|r},25°)$ and $E_m(k_{zp},k_{\|r},25°)$ at $k_z=0$ and $k_z=\pi/d$ by diagonalizing a band structure Hamiltonian of the superlattice using the expression:

$$E_j(k_{zp}, k_{\|r}, 25°) = E_j(k_z = 0, k_{\|r}, 25°) + \frac{E_j(k_z = \pi/d, k_{\|r}, 25°) - E_j(k_z = 0, k_{\|r}, 25°)}{2}[1 - \cos(k_{zp}a)].$$

where j may be either n or m, and d is a period of the superlattice;

(7) using the computer, evaluating $M(k_{zp}, k_{\|r}, 25°)$ using the expression:

$$|M(k_{zp}, k_{\|r}, 25°)| = |M(k_z = 0, k_{\|r}, 25°)| - \left[|M(k_z = 0, k_{\|r}, 25°)| - \left|M\left(k_z = \frac{\pi}{d}, k_{\|r}, 25°\right)\right|\right]k_z^2 d^2$$

where $|M(k_z=0,k_{\|r},25°)|$ and $|M(k_z=\pi/d,k_{\|r},25°)|$ are determined from the same diagonalizations of the Hamiltonian that provided the determinations of $E_n$ and $E_m$ at the given $k_z$ and $\phi$ values in step (6);

(8) using the computer, evaluating a chosen optoelectronic device performance characteristic F that depends on the first fundamental physical property $A_1$;

(9) using the computer, modifying one or more parameters in the layering configuration of the baseline superlattice structure to obtain a modified superlattice structure;

(10) repeating steps (2)-(8) to evaluate the optoelectronic performance characteristic F for the modified superlattice;

(11) if the value of F obtained for the modified superlattice is superior to that for the baseline superlattice, substituting the modified superlattice layering configuration as the new baseline; and

(12) repeating steps (10) and (11) until convergence to an optimal value of the performance characteristic F is reached;

wherein a baseline superlattice employed to obtain that value of F represents the superlattice layering configuration that best optimizes the performance characteristic F.

2. The method according to claim 1, further comprising the steps of:

(13) using the computer, identifying a second fundamental physical property, $A_2$, that is also determined by a three-dimensional integral over k-space using steps (2) through (7), with i=2;

(14) using the computer, replacing the three-fold integral in Equation (12) by finite sums over discrete intervals as step (5) with i=2;

(15) repeating steps (5)-(7) to evaluate the summations of step (14);

(16) using the computer, evaluating a chosen optoelectronic device performance characteristic F that depends on the first and second fundamental physical properties $A_1$ and $A_2$;

(17) using the computer, modifying one or more parameters in the layering configuration of the baseline superlattice structure to obtain a modified superlattice structure;

(18) evaluating the optoelectronic performance characteristic F for the modified superlattice;

(19) if the value of F obtained for the modified superlattice is superior to that for the baseline superlattice, substituting the modified superlattice layering configuration as the new baseline; and

(20) repeating steps (18) and (19) until convergence to an optimal value of the performance characteristic F is reached.

3. The method according to claim 2, further comprising:

(21) identifying additional fundamental physical properties, $A_3$, $A_4$, . . . that are also determined by three-dimensional integrals over k-space, with i=3, 4, . . . ;

(22) repeating steps (2)-(7) for each additional property $A_i$;

(23) using the computer, evaluating a chosen optoelectronic device performance characteristic F that depends on one or more of the fundamental physical properties $A_1, A_2, A_3, \ldots$;

(24) using the computer, modifying one or more parameters in the layering configuration of the baseline superlattice structure to obtain a modified superlattice structure;

(25) evaluating the optoelectronic performance characteristic F for the modified superlattice;

(26) if the value of F obtained for the modified superlattice is superior to that for the baseline superlattice, substituting the modified superlattice layering configuration as the new baseline; and

(27) repeating steps (25) and (26) until convergence to an optimal value of the performance characteristic F is reached.

* * * * *